(12) United States Patent
Hall et al.

(10) Patent No.: US 6,695,000 B2
(45) Date of Patent: Feb. 24, 2004

(54) CONTROL VALVE PRESSURE BLEED INSPECTION PORT

(75) Inventors: Randy Jerold Hall, Marshalltown, IA (US); Ronald Charles Burr, Marshalltown, IA (US); Mark Douglas Stiehl, Marshalltown, IA (US)

(73) Assignee: Fisher Controls International LLC, St. Louis, MO (US)

( * ) Notice: Subject to any disclaimer, the term of this patent is extended or adjusted under 35 U.S.C. 154(b) by 0 days.

(21) Appl. No.: 10/144,348

(22) Filed: May 10, 2002

(65) Prior Publication Data

US 2003/0089408 A1 May 15, 2003

Related U.S. Application Data

(60) Provisional application No. 60/336,087, filed on Nov. 15, 2001.

(51) Int. Cl.[7] .................. F16K 24/02; F16K 24/04; F16K 17/00
(52) U.S. Cl. ............. 137/312; 137/315.01; 137/315.27; 220/303; 220/360; 220/366.1; 285/13; 285/354; 285/924
(58) Field of Search .................. 137/15.17, 15.18, 137/312, 315.02, 637.2, 315.01, 315.27; 138/89; 166/91; 220/288, 303, 304, 366.1, 367.1, 18, 360; 285/354, 355, 901, 924, 13

(56) References Cited

U.S. PATENT DOCUMENTS

| | | | | |
|---|---|---|---|---|
| 2,893,435 A | * | 7/1959 | Eichenberg | 166/91.1 |
| 2,943,869 A | * | 7/1960 | Nordin | 137/594 |
| 3,160,427 A | * | 12/1964 | Natho | 166/91.1 |
| 3,456,679 A | * | 7/1969 | Graham | 137/315.02 |
| 3,540,760 A | * | 11/1970 | Miller et al. | 285/354 |
| 4,072,161 A | * | 2/1978 | Schoeneweis et al. | 137/315.04 |
| 4,337,788 A | * | 7/1982 | Seger | 137/315.02 |
| 4,444,220 A | * | 4/1984 | Seger | 137/312 |
| 4,503,878 A | * | 3/1985 | Taylor | 137/315.02 |
| 4,705,062 A | * | 11/1987 | Baker | 137/315.02 |
| 4,801,160 A | * | 1/1989 | Barrington | 285/354 |
| 4,817,994 A | * | 4/1989 | Bronnert | 285/901 |
| 4,921,281 A | * | 5/1990 | Taylor | 285/924 |
| 4,923,221 A | * | 5/1990 | Taylor | 285/924 |
| 4,926,898 A | * | 5/1990 | Sampey | 137/315.02 |
| 5,065,787 A | * | 11/1991 | Lochmann | 137/312 |
| 5,241,980 A | * | 9/1993 | Corte | 137/312 |
| 5,590,680 A | * | 1/1997 | Gugala et al. | 137/312 |
| 6,269,840 B1 | | 8/2001 | Beaver | 137/637.4 |

FOREIGN PATENT DOCUMENTS

| | | |
|---|---|---|
| DE | 905 566 | 3/1954 |
| GB | 1 381 927 | 1/1975 |

* cited by examiner

*Primary Examiner*—George L. Walton
(74) *Attorney, Agent, or Firm*—Marshall, Gerstein & Borun LLP

(57) ABSTRACT

A valve with an integral means for bleeding internal pressure prior to separation of a bonnet for the valve from its engagement with the valve body, provided by a bore through the valve body. This allows the internal pressure of the valve to equalize with atmospheric pressure prior to complete disassembly of the bonnet from the valve body. The bore through the valve body also serves as a leak detector, by providing a path for fluids passing through the valve to leak to the exterior of the valve body in the event of a failure of the seal between the bonnet and the valve body, which can readily be detected by passersby upon inspection of the exposed end of the bore at the exterior of the valve body.

11 Claims, 3 Drawing Sheets

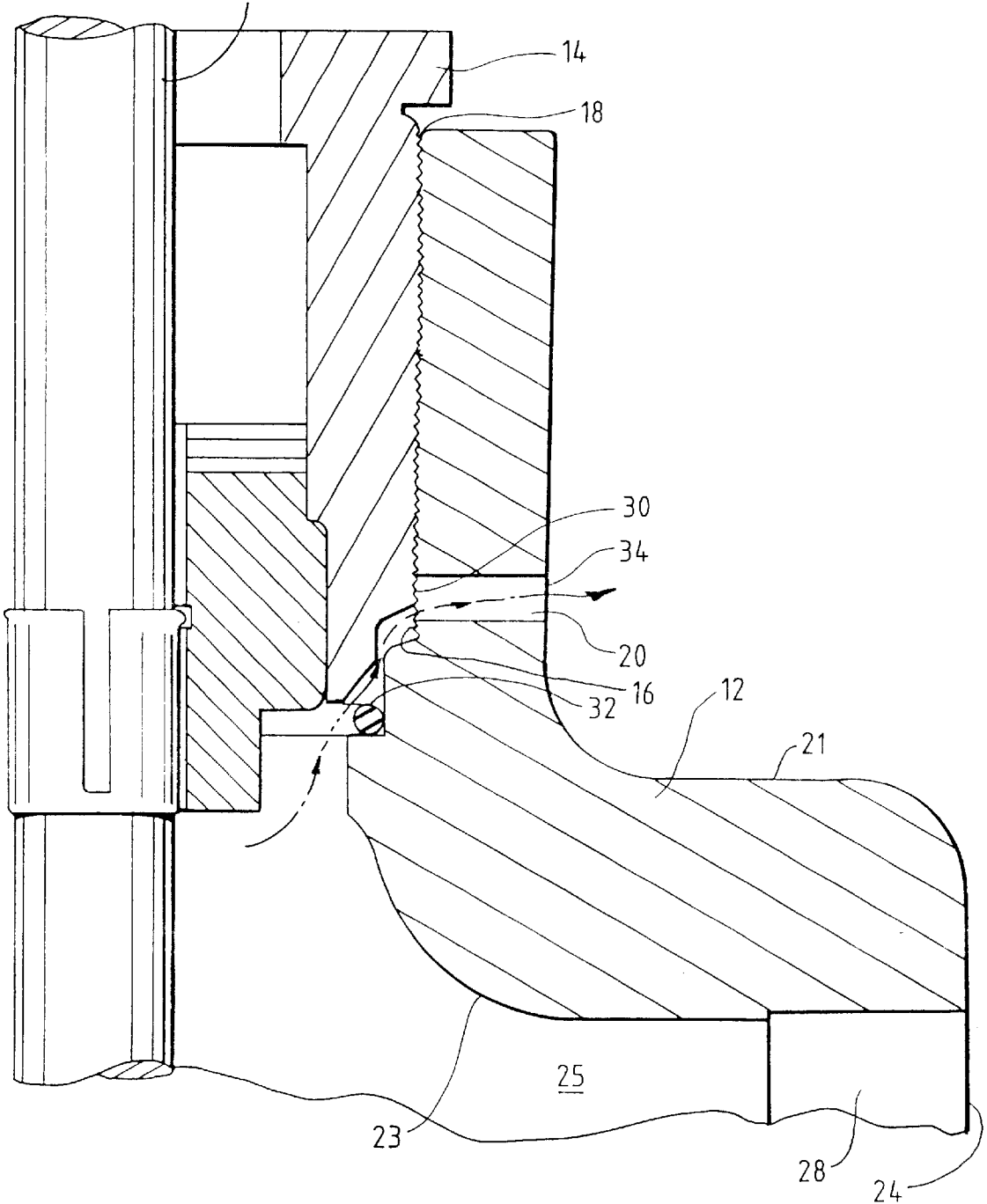

CONTROL VALVE PRESSURE BLEED INSPECTION PORT

REFERENCE TO RELATED APPLICATIONS

This application is based on U.S. Provisional Application No. 60/336,087, filed Nov. 15, 2001.

BACKGROUND

1. Field of the Invention

This invention relates generally to control valves and, more specifically, to the ability of a control valve to indicate loss of integrity of a sealed threaded joint therein, and to release internal pressure build-up within the control valve prior to disassembly of the control valve.

2. Description of the Prior Art

Notwithstanding the myriad of valves available for controlling the flow of fluid into or through a system, control valves have heretofore suffered from an inability (or poor ability) to indicate when there has been a loss of integrity of seals within the control valve. When a seal within a control valve fails, unless detected early, the resulting pressure loss in the system could lead to costly, and even dangerous consequences, particularly when highly flammable fluids are being passed through the control valve. Another shortcoming of existing control valves has been the inability to detect the presence of internal pressure within the valve during disassembly. If the internal pressure of the control valve is not released in a safe, controlled manner, the bonnet of the control valve could prematurely dislodge from the control valve, or an uncontrolled amount of fluid within or passing through the control valve could suddenly be released. This is why there are protocols for isolating and bleeding pressure out of control valves prior to disassembly. Nevertheless, it would be desirable for a control valve to provide an integral way to bleed its internal pressure prior to disassembly.

The manner in which these and other shortcomings of existing control valves are overcome is described in the following Summary of the Invention, Detailed Description of an Exemplary Embodiment, and the Drawings.

SUMMARY

In order to provide early detection of leakage in the seals within a control valve or in a bonnet of the control valve, the control valve is provided with an opening, or pressure bleed port, in the form of a bore in the body. The bonnet of the control valve is removably secured to the body of the control valve by a threaded interface. There is a seal between the bonnet and the interior wall of the body, in the immediate vicinity of a first end of the bore, or pressure bleed port, in the body. When there is an adequate pressure seal within the control valve, i.e. when there is no leakage present, none of the fluid whose flow rate is moderated by the control valve should be detected at the pressure bleed opening.

However, when there is a leaking seal within the control valve, the pressure differential between the atmosphere and the interior of the control valve causes some of the fluid in the control valve to leak out of the body of the control valve through the pressure bleed bore. The fluid exiting through the pressure bleed bore can then easily be detected, allowing a technician to observe there has been a seal failure between the body and the bonnet of the control valve.

Another useful purpose served by the passage through the valve body provided by the pressure bleed indicator port is the release of internal pressure within the control valve prior to disengaging the threaded connection between the bonnet and the valve body. If internal pressure builds up between the bonnet and valve body, such internal pressure needs to be relieved prior to disassembly. The pressure bleed indicator port exposes the interior of the control valve to the atmosphere as soon as the bonnet is unthreaded to a point at which it loses its seal with the valve body. At that point, the internal pressure of the control valve is released through the passageway (i.e., the inlet or outlet passageway of the control valve) immediately adjacent to the interior end, or second end, of the bleed bore, and travels through the bleed bore to the atmosphere, thereby equalizing with atmospheric pressure. Advantageously, the internal pressure is released prior to the bonnet being completely disengaged from its threaded connection with the body of the control valve.

DESCRIPTION OF THE SEVERAL VIEWS OF THE DRAWING

FIG. 3 is an enlarged cross-sectional view of the control valve shown in FIG. 1, similar to FIG. 2, but showing the control valve just as the bonnet has started to be unthreaded from the complementary threads of the valve body, such that the interior cavity of the control valve is exposed to the pressure bleed port in the valve body.

DETAILED DESCRIPTION OF AN EXEMPLARY EMBODIMENT

Figure 1:
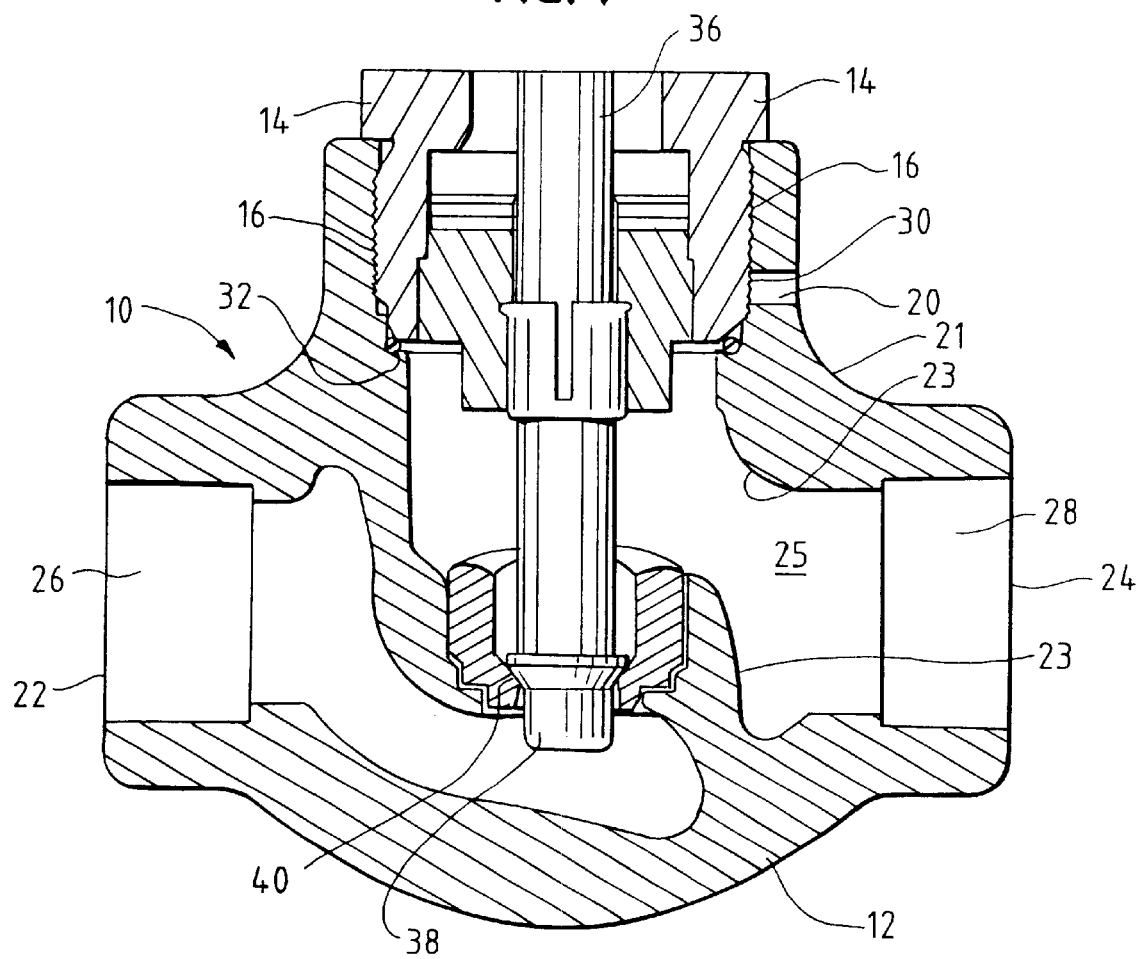
FIG. 1 is a cross-sectional view of a control valve, showing a cross-section of the valve body having a pressure bleed indicator therein, and a bonnet threadedly engaged with the valve body.

Referring to FIG. 1, the control valve 10 preferably includes a valve body 12 and a bonnet 14. The bonnet 14 is threadedly engaged with the valve body 12 by a plurality of female threads 16 in the valve body 12, and a plurality of male threads 18 (as best shown in FIG. 3) on the bonnet 14. A pressure bleed indicator is provided by means of a bore 20 through the valve body 12.

The valve body 12 includes an exterior wall 21, an interior wall 23, an inlet 22 and an outlet 24. The interior wall 23 of the valve body 12 defines an interior cavity 25, including an inlet passageway 28 and an outlet passageway 26. In an alternate example, the fluid inlet passageway 28 and the fluid outlet passageway 26 may be reversed, such that the fluid inlet passageway becomes the fluid outlet passageway, and the fluid outlet passageway becomes the fluid inlet passageway, thereby changing a downward flow valve to an upward flow valve. As a further alternate example (not shown), the fluid inlet and fluid outlet passageways may be at the same height as one another.

Figure 2:
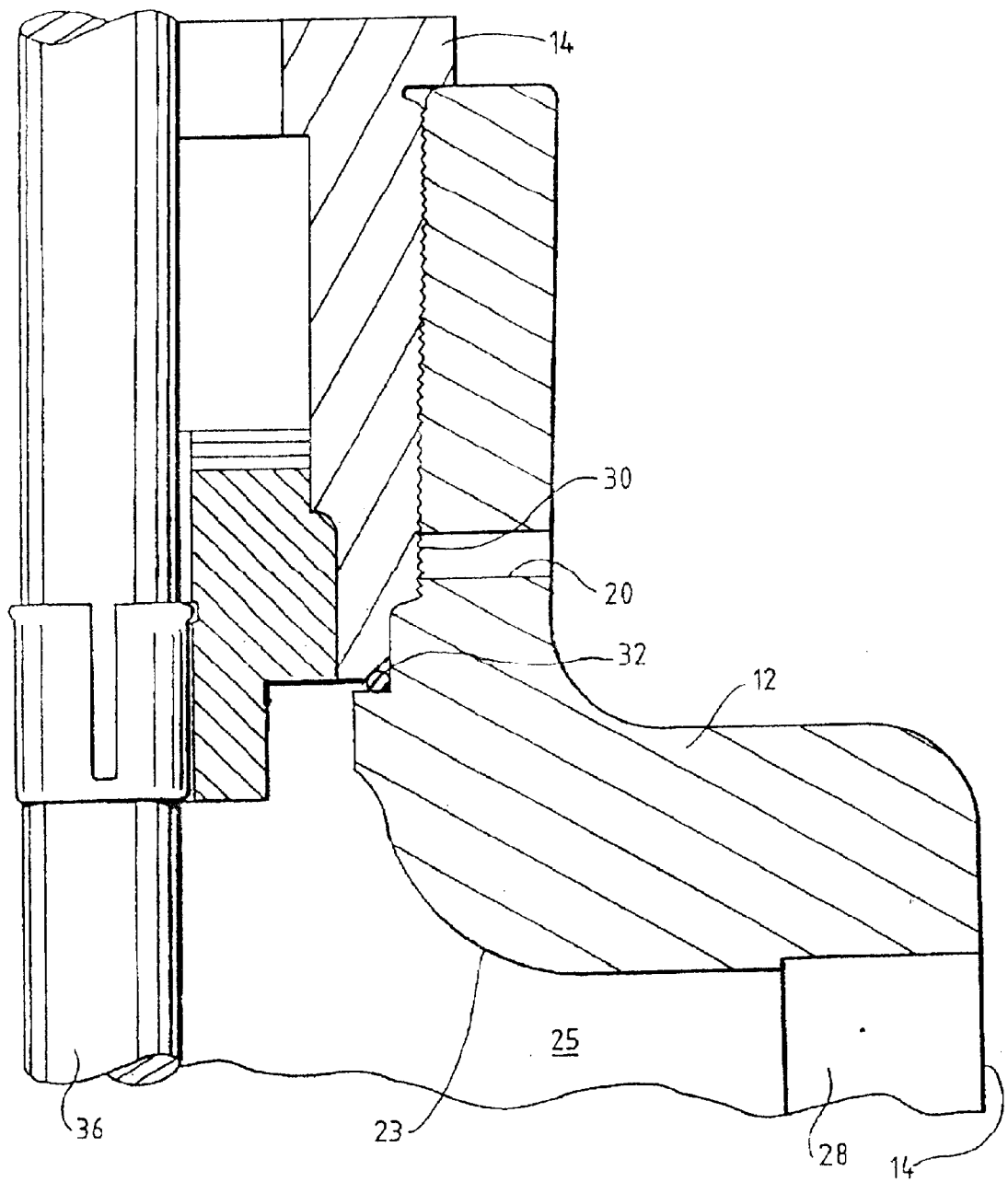
FIG. 2 is an enlarged cross-sectional view of the control valve shown in FIG. 1, showing the control valve body and bonnet in a sealed condition, with the bonnet in complete threaded engagement with the valve body.

An elastomeric gasket 32, such as an o-ring, helps maintain a seal between the bonnet 14 and the valve body 12 when the control valve 10 is fully assembled. When fully assembled, the bonnet 14 is preferably completely threadedly received in the valve body 12 such that the gasket 32 is in sealed contact with both the bonnet 14 and the valve body 12. The bore 20 of the pressure bleed indicator is preferably positioned such that when the gasket 32 is in sealed contact with both the bonnet 14 and the valve body 12, as shown in FIGS. 1 and 2, the bonnet 14 sealingly covers an innermost opening 30 of the bore 20.

As fluids, such as oil, water mixed with debris, or gas (although it will be understood by those of ordinary skill that these fluids are merely a few examples, and that the control valve 10 can be used for a wide variety of fluids, too numerous to list herein), pass through the outlet passageway 26 of the control valve 10, the seal between the bonnet 14 and the innermost opening 30 of the bore 20 prevents such fluids from leaking through the bore 20 of the pressure bleed indicator. If, however, there were to be a failure in the gasket 32, or elsewhere in the seal between the bonnet 14 and the valve body 12, fluids in the outlet passageway 26 would leak out the bore 20.

As control valves 10 of the type disclosed herein are frequently used, by way of example only, as dump valves for carrying away highly visible fluids containing hydrocarbons, and other waste fluids, during oil purification, as well as for many other applications involving flow control of fluids, both related and unrelated to oil purification, any fluids leaking out the pressure bleed indicator would advantageously be detectable, and if in liquid form, readily visible to passersby from outside the valve body 12.

In the event the control valve 10 were not properly isolated and bled of its internal pressure prior to disassembly, the present invention advantageously provides means by which any built-up internal pressure is equalized with atmospheric pressure before the bonnet 14 is completely disengaged from the valve body 12. Also, while removing the bonnet 14 while there is internal pressure in the control valve higher than atmospheric pressure, the bore 20 provides an audible and visual indicator of elevated internal pressure within the control valve 10. If such elevated internal pressure is detected, a technician has an opportunity to re-tighten the bonnet 14 and properly bleed pressure from the control valve 10.

In a conventional valve, if the internal pressure is not released prior to disassembling the bonnet from the valve body, the bonnet and any fluid in the interior cavity of the valve may undesirably fly or eject from the valve body in an uncontrolled manner during disassembly. The control valve 10 described herein substantially reduces the likelihood of this potentially dangerous situation.

As shown in FIG. 3, during unthreading the bonnet 14 from its sealed engagement with the female threads 16 of the valve body 12, the seal is broken and the interior cavity 25 is exposed to the bore 20 of the pressure bleed indicator, upon which any built-up internal pressure is equalized with the atmospheric pressure. The directional arrows in FIG. 3 show the internal pressure being released through the bore 20. Advantageously, as one initiates unthreading of the bonnet 14, a valve stem 36, having a valve plug 38 at a lower end thereof (see FIG. 1), moves upward. This upward movement of the valve stem 36 brings the valve plug 38 up off a valve seat 40. Thus, internal pressure of the control valve 10 is released upon exposure of the first open end 30 of the bore 20, regardless of whether the internal pressure had built up in the inlet passageway 28 or the outlet passageway 26.

If desired, a second end 34 of the bore 20, located at the exterior wall 21 of the valve body 12, may be provided with an indicating means, such as a cover (not shown). Such an indicating means could be actuated, upon release of internal pressure through the bore 20, from a closed position substantially covering the second end 34 to an open position, which would be a change visible to a technician or other maintenance person. This indicating means would show a person disassembling the bonnet from the control valve that the internal pressure had not previously been bled from the control valve prior to disassembly.

While the control valve pressure bleed port has been described with respect to certain embodiments thereof, it will be understood by persons of ordinary skill in the art that the appended claims are not intended to be limited thereto, and that modifications can be made that are considered within the scope of the claims.

We claim:

1. An improvement to a valve having a valve body, a bonnet threadedly securable to the valve body, said valve body having an interior wall, an exterior wall, and an interior cavity defined by the interior wall, the improvement comprising:

a bore extending from a first open end at the interior wall of the valve body to a second end at the exterior wall of the valve body, said first open end located at a position of the interior of the valve body such that said bonnet exposes said bore to an interior cavity defined by the interior wall of the valve body prior to removal of the bonnet from a threaded engagement with the valve body, and;

a gasket disposed along the interior wall of the valve body, prior to the threaded engagement, to create a pressure-assisted fluid seal between said bonnet and said valve body wherein said gasket is directly exposed to an operating pressure of the valve and a fluid passing therethrough when said bonnet is threadedly engaged with said valve body.

2. The valve of claim 1, the improvement further comprising that, upon exposure of the bore to the interior cavity, an internal pressure of the valve is equalized with atmospheric pressure.

3. The valve of claim 2, wherein the improvement further provides a means for detection of a leak in an engagement of said bonnet and said valve body, including said bore providing a path for leaked fluid within the valve body to travel from the first end of the bore to the second end of the bore at the exterior wall of the valve body, whereby said leaked fluid is detectable from outside the valve body.

4. The valve of claim 1, wherein the valve is a downward flow valve having an inlet passageway and an outlet passageway, the inlet passageway being located higher than the outlet passageway.

5. The valve of claim 1, wherein the valve is an upward flow valve having an inlet passageway and an outlet passageway, the inlet passageway being located lower than the outlet passageway.

6. The valve of claim 1, wherein the valve has an inlet passageway and an outlet passageway, the inlet passageway and the outlet passageway being located at the same height.

7. A valve assembly comprising:

a valve body having an interior wall and an exterior wall;

a bonnet threadedly engageable with said valve body;

an interior cavity defined by the interior wall, said interior cavity having an inlet passageway, an outlet passageway;

a gasket disposed along the interior wall prior to the portion that threadedly receives the bonnet, the gasket providing a pressure-assisted seal at an intersection of said bonnet and the interior wall of the valve body wherein said gasket is directly exposed to an operating pressure of the valve and a fluid passing therethrough when the bonnet is completely threadedly received in the valve body, and;

a bore extending through the valve body from the interior cavity to the exterior wall, the bore being sealingly covered by the bonnet when the bonnet is completely threadedly received in the valve body and the bore permitting at least one of the group of equalization of the operating pressure and the passing of fluid therethrough prior to the bonnet being completely removed from threaded engagement with the valve body.

8. The valve of claim 7, wherein the valve is a downward flow valve having an inlet passageway and an outlet passageway, the inlet passageway being located higher than the outlet passageway.

9. The valve of claim 7, wherein the valve is an upward flow valve having an inlet passageway and an outlet passageway, the inlet passageway being located lower than the outlet passageway.

10. The valve of claim 7, wherein the valve has an inlet passageway and an outlet passageway, the inlet passageway and the outlet passageway being located at the same height.

11. The valve assembly of claim 7, further comprising a cover associated with an end of the bore at the exterior wall of the valve body, the cover being actuated upon release of internal pressure through the bore from a closed position substantially covering the end of the bore to an open position.

* * * * *